(12) United States Patent
Raveendran et al.

(10) Patent No.: US 9,467,659 B2
(45) Date of Patent: Oct. 11, 2016

(54) METHOD AND APPARATUS FOR PROGRESSIVE CHANNEL SWITCHING

(75) Inventors: Vijayalakshmi R. Raveendran, San Diego, CA (US); Phanikumar Bhamidipati, San Diego, CA (US); Tao Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2444 days.

(21) Appl. No.: 11/527,305

(22) Filed: Sep. 25, 2006

(65) Prior Publication Data

US 2007/0071398 A1    Mar. 29, 2007

Related U.S. Application Data

(60) Provisional application No. 60/721,566, filed on Sep. 27, 2005.

(51) Int. Cl.
| | |
|---|---|
| *H04N 5/91* | (2006.01) |
| *H04N 5/781* | (2006.01) |
| *H04N 7/12* | (2006.01) |
| *G06K 9/36* | (2006.01) |
| *H04N 7/173* | (2011.01) |
| *H04N 21/234* | (2011.01) |
| *H04N 21/2343* | (2011.01) |
| *H04N 21/438* | (2011.01) |

(Continued)

(52) U.S. Cl.
CPC ........ *H04N 7/17336* (2013.01); *H04N 19/107* (2014.11); *H04N 19/114* (2014.11); *H04N 19/132* (2014.11); *H04N 19/147* (2014.11); *H04N 19/17* (2014.11); *H04N 19/174* (2014.11); *H04N 19/176* (2014.11); *H04N 19/194* (2014.11); *H04N 19/577* (2014.11); *H04N 19/61* (2014.11); *H04N 21/2343* (2013.01); *H04N 21/23424* (2013.01); *H04N 21/4383* (2013.01); *H04N 21/44016* (2013.01)

(58) Field of Classification Search
USPC ..................................................... 375/240.13
See application file for complete search history.

(56) References Cited

U.S. PATENT DOCUMENTS

| | | | |
|---|---|---|---|
| 5,040,061 A * | 8/1991 | Yonemitsu | ............... 375/240.13 |
| 5,793,895 A | 8/1998 | Chang et al. | |

(Continued)

FOREIGN PATENT DOCUMENTS

| | | |
|---|---|---|
| EP | 0653882 A1 | 5/1995 |
| EP | 0742674 A2 | 11/1996 |

(Continued)

OTHER PUBLICATIONS

Gabbouj M et al: "Isolated Regions in Video Coding" IEEE Transactions on Multimedia, IEEE Service Center, Piscataway, NJ, US, vol. 6, No. 2, Apr. 2004 (Apr. 2004), pp. 259-267 ISSN: 1520-9210.

(Continued)

*Primary Examiner* — Hee-Yong Kim
(74) *Attorney, Agent, or Firm* — Brent A. Boyd

(57) ABSTRACT

A method of processing a sequence of frames of multimedia data is presented. The method provides for progressively refreshing the image data. The method includes dynamically selecting portions of frames of the sequence with progressively increasing area to refresh, and excluding non-refreshed areas as potential reference data for other frames.

43 Claims, 7 Drawing Sheets

(51) Int. Cl.
*H04N 21/44* (2011.01)
*H04N 19/176* (2014.01)
*H04N 19/147* (2014.01)
*H04N 19/61* (2014.01)
*H04N 19/107* (2014.01)
*H04N 19/114* (2014.01)
*H04N 19/132* (2014.01)
*H04N 19/174* (2014.01)
*H04N 19/17* (2014.01)
*H04N 19/194* (2014.01)
*H04N 19/577* (2014.01)

(56) References Cited

U.S. PATENT DOCUMENTS

| | | | |
|---|---|---|---|
| 5,825,931 A * | 10/1998 | Owada et al. | 382/236 |
| 6,181,743 B1 * | 1/2001 | Bailleul | 375/240 |
| 6,502,045 B1 | 12/2002 | Biagiotti | |
| 7,116,714 B2 * | 10/2006 | Hannuksela | 375/240.12 |
| 2002/0061183 A1 * | 5/2002 | MacInnis | 386/68 |
| 2003/0016754 A1 * | 1/2003 | Gandhi et al. | 375/240.24 |
| 2004/0062307 A1 * | 4/2004 | Hallapuro et al. | 375/240.13 |
| 2004/0114817 A1 * | 6/2004 | Jayant et al. | 382/239 |

FOREIGN PATENT DOCUMENTS

| | | |
|---|---|---|
| EP | 1263238 A2 | 12/2002 |
| WO | WO0070546 | 11/2000 |
| WO | WO2004008735 | 1/2004 |

OTHER PUBLICATIONS

Heising G Ed—Institute of Electrical and Electronics Engineers: "Efficient and robust motion estimation in grid-basee hybrid video coding schemes" Proceedings 2002 International Conference on Image Processing. ICIP 2002. Rochester, NY, Sep. 22-25, 2002, IEEE, US, vol. 2, Sep. 22, 2002 (Sep. 22, 2002), pp. 697-700, XP010607419.

International Preliminary Report on Patentability—PCT/US06/037945, International Search Authority—European Patent Office—Apr. 1, 2008.

International Search Report—PCT/US06/037945, International Searching Authority—European Patent Office—Dec. 3, 2007.

"ISO/IEC CD 13818-: Information Technology—Generic Coding of Moving Pictures and Associated Audio Information Part 2: Video" International Standard—ISO, Zuerich, CH, No. 659, Dec. 1, 1993 (Dec. 1, 1993), p. 11,12,46,47, XP002459214.

Mitchell J L et al: "MPEG video compression standard, Passage" MPEG Video Compression Standard, Chapman and Hall Digital Multimadia Standards Series, New York, Chapman and Hall, US, 1996, p. 145-147, 198-202, XP002459250.

Taiwanese Search Report—No. 095135857—TIPO, Mar. 15, 2010.

Wang Y-K et al: "Isolated Regions: Motivation, Problems, and Solutions" International Standard ISO/IEC MPEG & ITU-T VCEG, Document JVT-C072, May 6, 2002 (May 6, 2002), pp. 1-13, XP001074693.

Written Opinion—PCT/US06/037945, International Searching Authority—European Patent Office—Dec. 3, 2007.

* cited by examiner

METHOD AND APPARATUS FOR PROGRESSIVE CHANNEL SWITCHING

CROSS-REFERENCE TO RELATED APPLICATIONS

Claim of Priority Under 35 U.S.C. §119

The present application for patent claims priority to Provisional Application No. 60/721,566 entitled "A METHOD AND APPARATUS FOR PROGRESSIVE CHANNEL SWITCHING" filed Sep. 27, 2005, and assigned to the assignee hereof and hereby expressly incorporated by reference herein.

BACKGROUND

1. Field

This disclosure is directed to methods, apparatus and systems for distributing digital data encoded in a way to enable random access of a data stream.

2. Description of the Related Art

Digital video and audio compression technologies have ushered in an era of explosive growth in digital multimedia distribution. Since the early 1990's, international standards groups such as, for example, the Video Coding Experts Group (VCEG) of ITU-T and the Motion Pictures Expert Group of ISO/IEC, have developed international video recording standards. The standards developed include, for example, MPEG-1, MPEG-2, MPEG-4 (collectively referred to as MPEG-x), H.261, H.262, H.263, and H.264 (collectively referred to as H.26x).

The international video recording standards follow what is known as a block-based hybrid video coding approach. In the block-based hybrid video coding approach, pixels serve as the basis of digital representation of a picture or, as it is commonly called and will be referred to in this application, a frame. A group of pixels form what is known as a block. A common block size for performing digital compression operations on is known as the macroblock. Macroblocks are made up of 16×16 pixels. Sub-macroblocks are made up of smaller sets of pixels including, for example, 16×8, 8×16, 8×8, 8×4, 4×8, and 4×4 pixels. Compression operations can also be performed on sub-macroblocks, therefore in order to not obscure the inventive aspects of the invention, the operations will be discussed as operating on portions of a frame which can include all block sizes or groups of block sizes. A group of macroblocks form what is known as a slice. Slices can be made up of contiguous macroblocks in the form of, for example, a row, a column, a square, or a rectangle. Slices can also be made up of separated macroblocks or a combination of separated and contiguous macroblocks. Slices are grouped together to form a frame at one point in time of a sequence of frames that form a video sequence.

The MPEG-x and H.26x standards describe data processing and manipulation techniques that are well suited to the compression and delivery of video, audio and other information using fixed or variable length source coding techniques. In particular, the above-referenced standards, and other hybrid coding standards and techniques will compress video information using intra-frame coding techniques (such as, for example, run-length coding, Huffman coding and the like) and inter-frame coding techniques (such as, for example, forward and backward predictive coding, motion compensation and the like). Specifically, in the case of video processing systems, hybrid video processing systems are characterized by prediction-based compression encoding of video frames with intra-frame and/or inter-frame motion compensation encoding.

Inter-frame coding techniques exploit temporal correlation between frames in video sequences. Temporal prediction, which is typically used for this purpose, reduces the random access points in the compressed bitstream because decoding of the current temporally predicted frame cannot be accomplished unless the frame upon which the current frame references is previously decoded. Hence, at the decoder or user application end, the received bitstream (in the form of downloaded files or streamed bits in the case of streaming media) may not be played back instantaneously. Instead, decoding may start only at pre-determined random access points in the stream/file such as, for example, Intra-coded frames or IDR frames. IDR, or Instantaneous Decoder Refresh, frames were introduced in H.264 and may be used as a random access point. Information prior (in time) to an IDR frame may not be used as a reference for subsequent frames with any of the above mentioned inter-coding techniques. In video streaming applications, particularly in multicast scenarios, the ability to decode instantaneously (or sooner than later) may be preferable from a user experience point of view.

Intra-coding techniques result in less compression than inter-coding techniques. As a result, increasing the frequency of IDR and Intra-coded frames may cause too high a bit rate while supplying frequent random access points. An improved, potentially lower bit rate method of providing a random access point is needed.

Streaming video systems usually may need to switch between different channels. The maximum time spent on switching from an old channel to a new channel should usually be upper-bounded to improve user experience.

Traditionally intra (I-) frames are introduced at the beginning of every group of picture (GOP) to limit the drifting between the encoder and the decoder. I-frames can also be used to mitigate error propagation caused by noisy channels, and they are especially effective combined with the concept of instantaneous decoding refresh (IDR) in the frame work of advanced video coding (AVC).

The methodology of using I-frames can be borrowed for channel switching. An IDR I-frame can be placed at the beginning of every GOP, which can remove the dependency of the video content in the new GOP on the content in the old GOP.

However, there are several disadvantages by using this scheme.

First, I-frames are bulky in size, which typically causes a peak in instantaneous bit rate at the beginning of every GOP. Peak-to-average ratio of frame sizes is increased with huge I-frames, which may require a bigger decoding buffer and more stringent decoder timing, otherwise, bursts of data may clog the decoder. This effect can make the design of hardware decoders based on ARM or DSP more complex and expensive.

Second, there is a lot of spatial dependency between macroblocks (MBs) in an I-frame. Although the AVC standard allows spatial prediction inside of I-frames, the prediction is limited to adjacent neighbors and in a causal fashion only. The total number of intra-coded MBs is at least the number of MBs in a picture, because all the MBs are intra-updated at the same point in time. However, if we choose to intra-update a portion of a picture in multiple points in time, we may use motion estimation to reduce the number of intra-MBs that may be required.

Third, some intra-coded MBs in the initial I-frame may never be referenced in ensuing pictures. For example, an object can disappear in the period of several frames. This occurs if the object moves out of the picture, or it is covered by other objects. In this case, the MBs representing this object may not be required to be intra-coded because ensuing frames do not contain this object any more and are not predicted from it. Another example is single frame camera flashes. Due to the significant luma shift at a camera flash frame, its MBs are normally useless for prediction of future frames (without camera flashes). Similarly, the camera flashed area may not be intra-coded to improve encoding efficiency.

SUMMARY

Method, apparatus and system that progressively refreshe a frame of multimedia data are disclosed. The progressive refreshing can be used, for example, when the desired multimedia data content source is changing from one channel to another. This scheme effectively reduces peak-to-average ratio of frame sizes and the number of MBs that need to be intra-coded.

One aspect is a method of processing a sequence of frames of multimedia data, the method including selecting a first portion of a first frame of the sequence, refreshing the first portion by intra-coding the first portion, selecting at least one second portion of a second frame of the sequence, where the at least one second portion covers an area of the second frame that is co-located with the first portion, refreshing the at least one second portion by coding the at least one second portion, dynamically selecting at least one third portion of the second frame, refreshing the at least one third portion by coding the at least one third portion, where the at least one second portion and the at least one third portion are optionally used as reference data for subsequent frames.

Another aspect is a apparatus configured to process a sequence of frames of multimedia data, the apparatus including means for selecting a first portion of a first frame of the sequence, means for refreshing the first portion by intra-coding the first portion, means for selecting at least one second portion of a second frame of the sequence, where the at least one second portion covers an area of the second frame that is co-located with the first portion, means for refreshing the at least one second portion by coding the at least one second portion, means for dynamically selecting at least one third portion of the second frame, means for refreshing the at least one third portion by coding the at least one third portion, where the at least one second portion and the at least one third portion are optionally used as reference data for subsequent frames.

Another aspect is a electronic device configured to process a sequence of frames of multimedia data, the device including a first selection module, configured to select a first portion of a first frame of the sequence, a first encoding module, configured to refresh the first portion by intra-coding the first portion, a second selection module, configured to select at least one second portion of a second frame of the sequence, where the at least one second portion covers an area of the second frame that is co-located with the first portion, a second encoding module, configured to refresh the at least one second portion by coding the at least one second portion, a third selection module, configured to dynamically select at least one third portion of the second frame, a third encoding module, configured to refresh the at least one third portion by coding the at least one third portion, where the at least one second portion and the at least one third portion are optionally used as reference data for subsequent frames.

Another aspect is a machine readable medium having instructions for causing a machine to execute a method of processing a sequence of frames of multimedia data, the method including selecting a first portion of a first frame of the sequence, refreshing the first portion by intra-coding the first portion, selecting at least one second portion of a second frame of the sequence, where the at least one second portion covers an area of the second frame that is co-located with the first portion, refreshing the at least one second portion by coding the at least one second portion, dynamically selecting at least one third portion of the second frame, refreshing the at least one third portion by coding the at least one third portion, where the at least one second portion and the at least one third portion are optionally used as reference data for subsequent frames.

DETAILED DESCRIPTION OF CERTAIN ASPECTS

A method, apparatus and system for encoding a frame sequence of digital data so as to enable users of receiving devices to more effectively access video streams is described herein. The method, apparatus and system provide a low-bit rate alternative to an intra-frame encoded access points approach. Certain details have been left out in order to not obscure the inventive aspects of the invention. The specific details not described in the present application are within the knowledge of a person of ordinary skill in the art.

Figure 1:
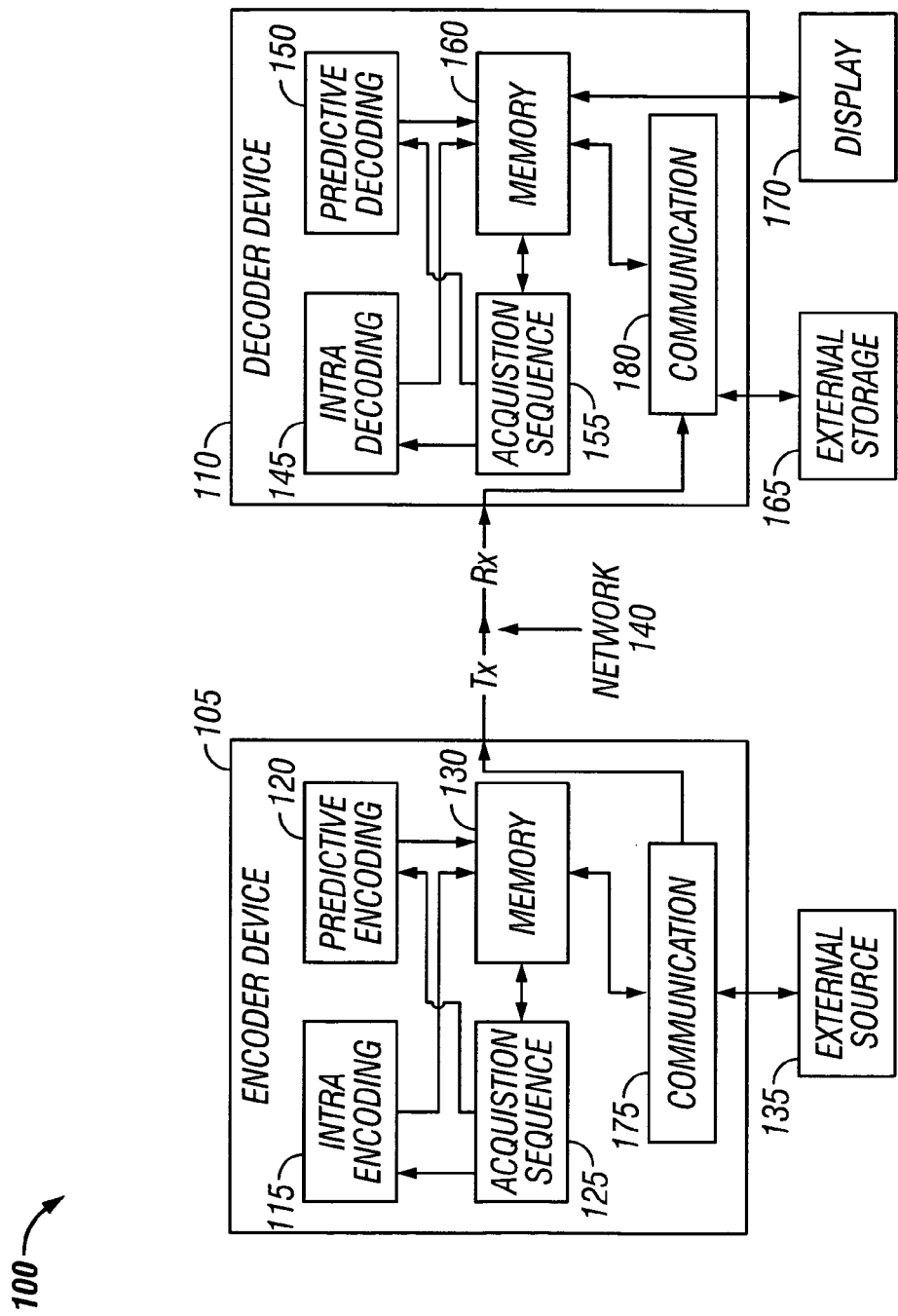
FIG. 1 is a block diagram of a general communications system for encoding and decoding multimedia data.

FIG. 1 is a block diagram of a general communications system for encoding and decoding streaming pictures. The system 100 includes encoder device 105 and decoder device 110. Encoder device 105 further includes intra encoding component 115, predictive encoding component 120, acquisition sequence component 125, memory component 130 and communications component 175. Encoder device 105 is able to receive data from external source 135 using communication logic contained in communications component 175. External source 135 could be, for example, external memory, the Internet, a live video and/or audio feed, and receiving the data can include wired and/or wireless communications. The data contained in external source 135 can be in a raw (not encoded) or encoded state. Intra encoding component 115 is used to encode intra-coded portions of frames (slices, macroblocks and sub-macroblocks). Predictive encoding component 120 is used to encode predicted portions of frames, including forward prediction, backward prediction and bi-directional prediction. In addition to containing the logic used to encode the predicted frames, predictive encoding component 120 also contains the logic used to choose reference frames for the predicted portions.

Encoder device 105 can access raw or encoded data for encoding. Encoded data can be accessed in order to replace intra-coded portions with inter-coded portions, and vice versa, so as to convert an encoded frame sequence into an acquisition sequence, which progressively refreshes a complete frame of multimedia data. When accessing encoded data (either intra-coded or inter-coded data), the logic contained in intra encoding component 115 and predictive encoding component 120 decodes the encoded data resulting in reconstructed raw data. This reconstructed raw data, or accessed raw data, can then be encoded in such a way as to include an acquisition sequence. Acquisition sequence component 125 contains logic used to determine which portions of each acquisition frame in an acquisition sequence should be intra-coded by intra encoding component 115, and which portions of each acquisition frame in the acquisition sequence should be inter-coded by predictive encoding component 120. Acquisition sequence component 125 also contains logic restricting which frames in the acquisition sequence can be referenced by inter-coded portions of other frames. After encoding, the encoded frames are stored in memory component 130 or external memory. The external memory can be the same as external source 135 or a separate memory component (not shown). Communications component 175 contains logic used for transmission (Tx) in conjunction with network 140. Network 140 can be part of a wired system such as telephone, cable, and fiber optic, or a wireless system. In the case of wireless, communication systems, network 140 can comprise, for example, part of a code division multiple access (CDMA or CDMA2000) communication system or alternately, the system can be a frequency division multiple access (FDMA) system, orthogonal frequency division multiple access (OFDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1×EV-DO or 1×EV-DO Gold Multicast) system, or in general any wireless communication system employing a combination of techniques. The encoded frames are transmitted (Tx) over network 140. The encoding processes performed by the components of encoder device 105 are more fully described below.

Decoder device 110 contains similar components to encoder device 105, including, intra decoding component 145, predictive decoding component 150, acquisition sequence component 155, memory component 160 and communications component 180. A decoder device that has no acquisition sequence component can proceed with decoding in a normal manner where acquisition is oblivious to the decoder and still be afforded a random access point. Acquisition sequence component 155 can allow the decoder to locate an acquisition sequence and decode only those portions appropriate for acquisition, thus improving the efficiency of the decoding process. Decoder device 110 receives encoded data that has been transmitted over network 140 or from external storage 165. Communications component 180 contains logic used for receiving (Rx) encoded data in conjunction with network 140, as well as logic for receiving encoded data from external storage 165. External storage 165 could be, for example, external RAM or ROM, or a remote server. Intra decoding component 145 is used to decode intra-coded data. Predictive decoding component 150 is used to decode inter-coded data. Acquisition sequence component 155 contains logic used for enabling initial acquisition of a bitstream containing an acquisition sequence, such as to refresh to a new channel after channel switching by a user, or upon first acquiring a signal. However, as described above, a standard decoder device, which lacks the acquisition sequence component 155, can also decode the acquisition sequence without first identifying it. By its very nature of being independent of preceding data, an acquisition sequence can be decoded when received. An acquisition sequence contains a number of acquisition frames. The acquisition sequence is first identified and then those portions of the acquisition frames that are intra-coded are decoded by intra decoding component 145. Any subsequent inter-coded portions of the acquisition frames referencing the decoded intra-coded portions are decoded by predictive decoding component 150. After all intra-coded portions and subsequent inter-coded portions of all the acquisition frames contained in the acquisition sequence are decoded, the result is a completely refreshed viewable frame made up of the combined intra-coded and inter-coded portions. After decoding, the decoded frames can be displayed on display component 170 or stored in internal memory 160 or external storage 165. Display component 170 can be an integrated part of the decoding device, such as a display screen on a phone or PDA (personal digital assistant) or an external peripheral device. The decoding processes performed by decoder device 110 are more fully described below.

Intra-coding, as used in intra encoding block 115 and intra decoding block 145 of FIG. 1, is a method of digital compression based on the current portion of a picture without reference to other pictures. Intra-coding may first use spatial prediction where pixel values can be predicted from their neighbor pixel values. Currently, only H.264 supports spatial prediction. H.264 supports two spatial prediction modes for luma values, namely 16×16 macroblock spatial prediction and 4×4 sub-macroblock spatial prediction. H.264 provides one prediction mode for chroma, namely 8×8. In 8×8 mode, an 8×8 chroma block is predicted in ways similar to the 16×16 luma macroblock. After spatial prediction, the residual information is transformed using, for example, a discrete cosine transform (DCT), or an integer transform in the case of H.264, and then quantized. Intra-coding may be done on the slice level where a slice may be made up of a group of macroblocks (16×16 pixel macroblocks). An intra-coded slice or I-slice contains only intra-coded macroblocks and does not use temporal prediction. An entire frame may be intra-coded, known as an I-frame, and may be used as a random access point. An I-frame (or I-slice) contains all the appropriate information to display the picture represented by the compressed data unlike an inter-coded or predicted frame that is discussed below. For this reason, I-frames can be used for the initial frame in a random access scenario. However, I-frames may not provide as much compression as an inter-coded or predicted frame.

The DCT is only one type of invertible 2-dimensional transform that can be used. Other possible transforms include, for example, a discrete wavelet transform (DWT), an integer transform like in H.264, or a Hadamard transform. The quantization of the transformed coefficients can be changed for every macroblock. After quantization, entropy coding such as, for example, Huffman coding, variable length coding or binary arithmetic coding is used for further digital compression. Entropy coding can replace strings of bits that occur most often with shorter codes and can replace strings of bits that occur less often with longer codes. Entropy coding can be context adaptive in order to take advantage of patterns as they appear in the data being coded. Context adaptive coding can operate on the slice level or lower such as, for example, macroblock level, or sub-macroblock level.

Inter-coding or, as it is also known, predictive coding is a form of temporal prediction which can take advantage of similarities between time points using, for example, motion estimation to allow for greater digital compression than intra-coding. Inter-coding is performed by predictive encoding block 120 and predictive decoding block 150 in FIG. 1. Inter-coding can look at each picture on a macroblock level or lower by searching reference pictures at another time point for similar blocks. If a match is found, instead of storing all the DCT coefficient values for the entire block, the system stores a much smaller motion vector and residual error. The motion vector describes the movement (or lack of movement) of the block between temporal pictures, and the residual error component corrects for the difference between the reference point. In this way, efficient compression is achieved.

Inter-coding includes, for example, forward prediction, backward prediction and bi-directional prediction from one or more reference frames. In forward prediction, a matching macroblock in the reference frame (based on a cost-function analysis) is used as a prediction for a macroblock in a subsequent frame. In backward prediction, a matching macroblock in the reference frame (based on a cost-function analysis) is used as a prediction for a macroblock in a previous frame. In bi-directional prediction, the current frame being inter-coded is located between a previous reference frame and a subsequent reference frame. Matching macro blocks from the previous and subsequent reference frames are combined (combined using, for example, a simple average or a weighted average) to form a prediction for a macroblock in the current frame. Forward prediction, backward prediction, and bi-directional prediction, from any number of reference frames, are herein collectively referred to as "inter-coding" or as "inter-coded" techniques.

Figure 2:
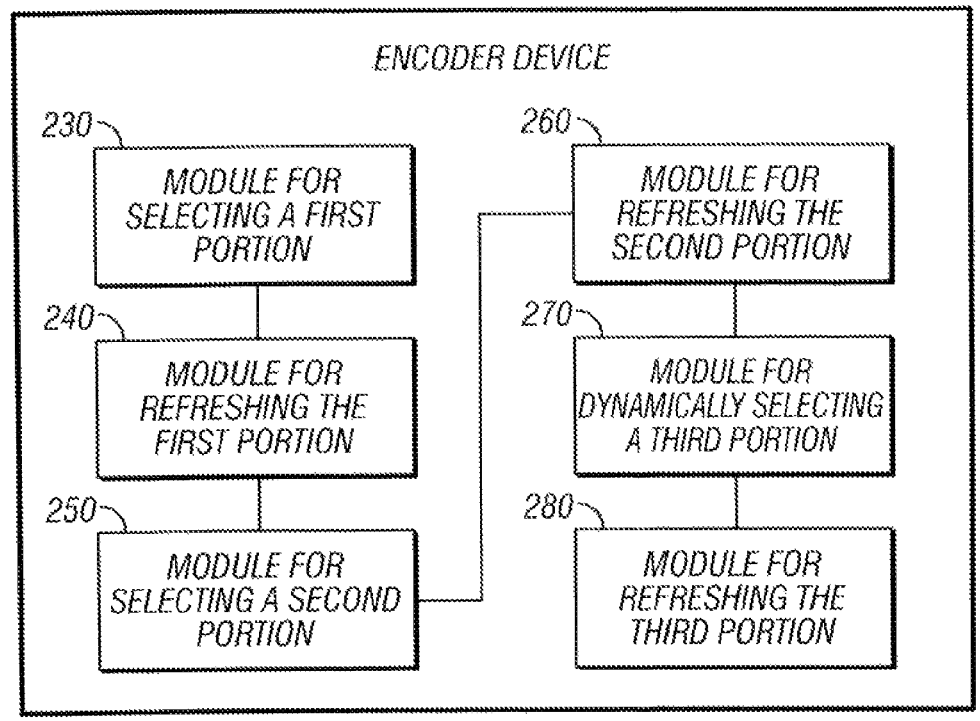
FIG. 2 is a block diagram of an encoding device.

FIG. 2 is a block diagram of an encoder configured to encode streaming pictures for a general communications system. The encoder may have functionality similar to encoder 105 of FIG. 1, and includes module for selecting a first portion 230, configured to select a first portion of a first frame of a refresh sequence. The encoder also includes module for refreshing the first portion 240, configured to intra-code the first portion so as to refresh the first portion. The encoder further includes module for selecting a second portion 250, configured to select a second portion of a second frame of the refresh sequence, such that the second portion covers at least the area of the second frame co-located with the first portion. The encoder also includes module for refreshing the second portion 260, configured to code the second portion. The encoder further includes module for dynamically selecting a third portion 270, and module for refreshing the third portion 280, configured to code the third portion.

Figure 3A:
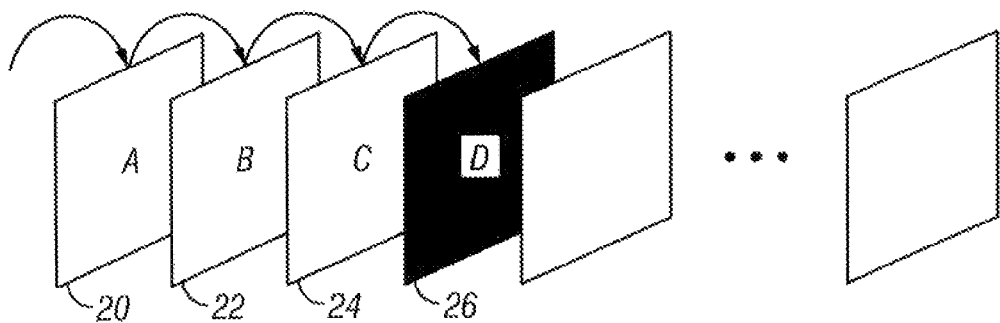
FIG. 3A depicts sequential access of a frame-based bitstream.
Figure 3B:
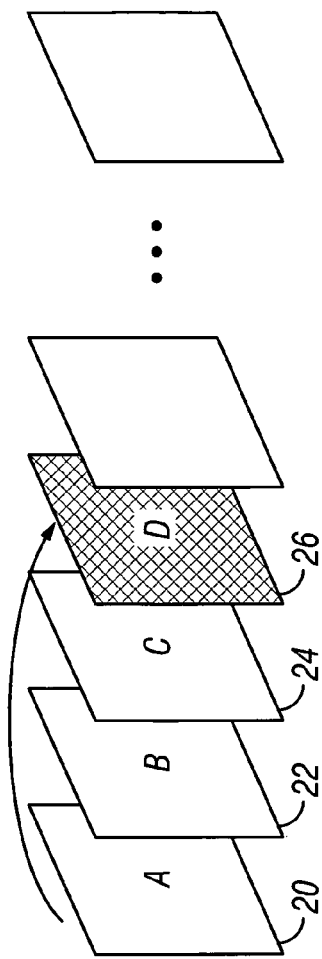
FIG. 3B depicts random access of a frame-based bitstream.

Random access refers to the ability to access data at any point in time. Sequential access, unlike random access, may require decoding of all intervening points. FIG. 3A depicts sequential access of a frame-based bitstream. Frames 20, 22, 24 and 26 are decoded sequentially. This would be the case if frame 22 was forward predicted from frame 20, frame 24 was forward predicted from frame 22, and frame 26 was forward predicted from frame 24. FIG. 3B depicts random access of a frame-based bitstream. Frame 26 is immediately decoded without decoding frames 20, 22 or 24. Frame 26 could be decoded if, for example, it was an entirely intra-coded frame.

Video acquisition is a form of random access, which can involve other restraints such as, for example, system acquisition at lower OSI (open systems interconnection) layers. Video acquisition refers to the state when the application layer (where the video decoder can reside) is able to commence display of video. In the case of hybrid coded video bit streams, due to inter-coding, random access or video acquisition may not be accomplished on all frames. The decoder may move back and forth in the bitstream to locate the random access point. Intra-coding an entire frame is one method of providing a random access point. However, some power limited devices, processor-limited devices, or data-rate-limited channels may not be able to accommodate frequent intra-coding of entire frames of data.

Figure 4:
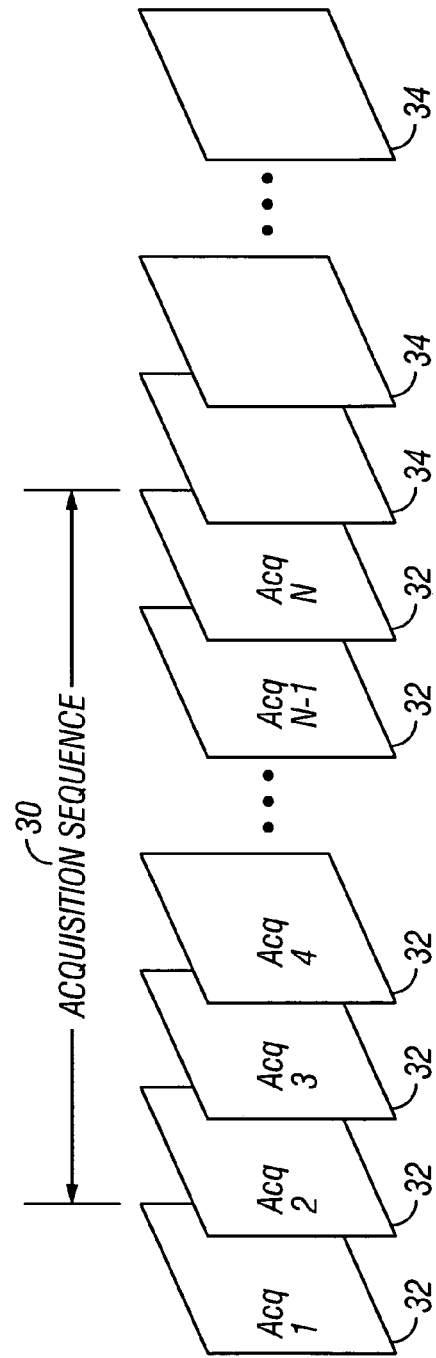
FIG. 4 is an illustration of an example of an acquisition frame sequence.

The acquisition sequence provides an alternative to intra-coding an entire video frame to provide random access points. FIG. 4 is an illustration of an example of an acquisition sequence. The acquisition sequence 30 contains N acquisition frames 32 (frames labeled "Acq 1" through "Acq N") that include intra-coded portions. Also shown in the bitstream, outside the acquisition sequence, are non-acquisition frames 34 (unlabeled frames). The intra-coded portions can be in any shape or size such as, for example, pixels, blocks, sub-macroblocks, macroblocks or slices. Each acquisition frame 32 also contains inter-coded portions made up of the remaining blocks that are not intra-coded. Non-acquisition frames 34 may also contain both intra-coded and inter-coded portions.

Figure 5:
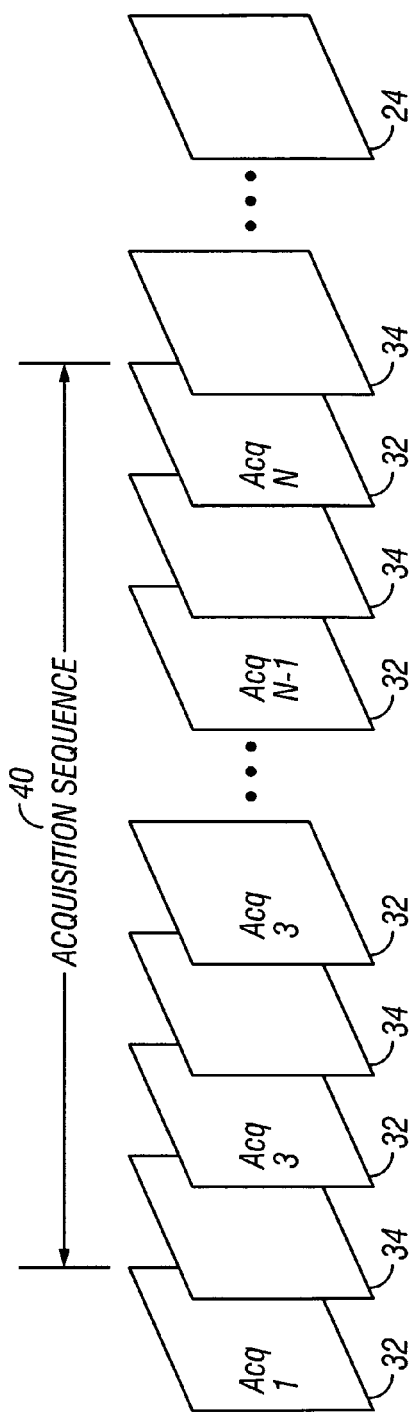
FIG. 5 is an illustration of another example of an acquisition frame sequence.

FIG. 5 is an illustration of another example of an acquisition sequence. This example includes non-acquisition frames 34 interspersed between N acquisition frames 32 (labeled "Acq 1" through "Acq N") in the acquisition sequence 40. Interspersing non-acquisition frames between acquisition frames increases the delay in video acquisition, but it can provide better compression efficiency or reduced bit rate when lower layers don't provide random access at the corresponding granularity. The acquisition frames 32 contain intra-coded and inter-coded portions. Non-acquisition frames 34 that are interspersed between acquisition frames 32 may or may not have to follow restrictions on inter-coding as discussed below, depending on whether or not the acquiring device decodes non-acquisition frames during acquisition. The restrictions on inter-coding discussed below allow an acquiring device to achieve proper acquisition without inter-predicted portions becoming corrupted due to dependence on a non-decoded portion.

In order for a decoder to establish video acquisition, the decoder decodes the intra-coded portions of the N acquisition frames in the acquisition sequence. Inter-coded portions (forward, backward or bi-directional) contained in other frames (acquisition or non-acquisition frames) that reference previously decoded portions (inter-coded or intra-coded portions) in the acquisition sequence can be decoded as well. Positioning intra-coded portions (as presented below), an intra-coded composite can be formed by combining the intra-coded portions of the N acquisition frames. After N acquisition frames in the acquisition sequence are decoded and the combined intra-coded composite is formed, video acquisition is completed.

Some implementations utilize acquisition sequences located at certain intervals in the data stream. Including an acquisition sequence at a regularly spaced time period such as, for example, every one or two seconds, can allow a receiving device attempting random access to easily search a small amount of bitstream data to locate the acquisition sequence and obtain video acquisition quickly, thereby improving a user's experience. Typically, I frames would be included in the bitstream to allow for frequent random access, but at the cost of less compression and higher data rate or less quality for the same data rate. Thus, with the method described, delay in acquiring a bit stream, such as when changing channels, can be reduced while affording a lower data rate than I frames alone. The method also may be used to generate frames at the beginning of a superframe, which is a group of frames. In some implementations, a superframe comprises one second worth of frames.

Figure 6:
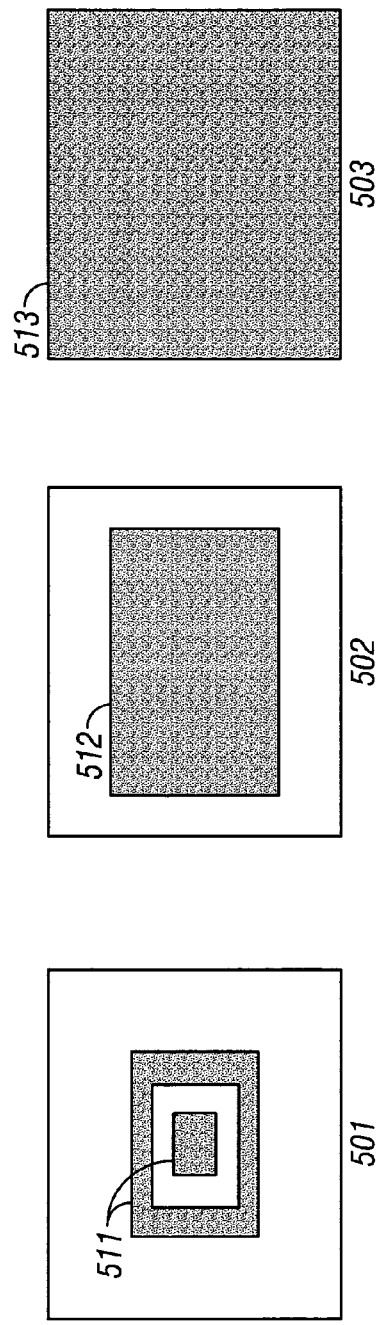
FIG. 6 depicts a frame sequence where a frame of multimedia data is refreshed.

FIG. 6 depicts a frame sequence where a completely refreshed viewable frame is progressively generated by, for example, acquisition sequence component 125 of FIG. 1, or module for selecting 225 of FIG. 2. In this example, the acquisition sequence comprises three acquisition frames 501-503. Acquisition frame 501 comprises a first refresh portion 511, which is restricted to being refreshed, which may be accomplished by intra-coding. In this example, first refresh portion 511 is discontinuous, and is in the central portion of acquisition frame 501. In some examples, first refresh portion 511 may be continuous, non-rectangular, and/or not in the central portion of an acquisition frame. The portion of acquisition frame 501 not included in first refresh portion 511 is unrestricted, and therefore may be encoded by either intra-coding or inter-coding, and may be either refreshed or not refreshed. For example, if a portion of acquisition frame 501 not included in first refresh portion 511 were to be inter-coded referencing unrefreshed data of a previous frame, the portion would be likewise unrefreshed.

Acquisition frame 502 comprises a second refresh portion 512, which covers and extends beyond a co-located area of the first refresh portion 511. Although shown in FIG. 6 with certain geometric characteristics, second refresh portion 512 is not limited to the shown characteristics. For example, second refresh portion 512 may have an irregular shape, may not be continuous, and/or may surround or partially surround one or more portions not included in second refresh portion 512. Second refresh portion 512 may be encoded by either intra-coding or inter-coding, and is restricted to being refreshed. Thus, refresh portion 512 is either intra-coded or predicted from the first refresh portion 511 of first acquisition frame 501. The portion of acquisition frame 502 not included in second refresh portion 512 is unrestricted, however, and therefore may be encoded by either intra-coding or inter-coding, and may be either refreshed or not refreshed.

Acquisition frame 503 comprises a third refresh portion 513, which covers and extends beyond a co-located area of the second refresh portion 512. As shown in FIG. 6, third refresh portion 513 substantially completely covers acquisition frame 503. Third refresh portion 513 may be encoded by either intra-coding or inter-coding, and is restricted to being refreshed. Therefore, if any part of the third refresh portion 513 is inter-coded, it uses a refreshed portion of a prior acquisition frame, such as first refresh portion 511 or second refresh portion 512, as a reference for the inter-coding. In this example, the acquisition sequence comprises three frames. In other examples, acquisition sequence component 125 of FIG. 1 or module for selecting 225 of FIG. 2 can include more or fewer frames in the refresh sequence.

It is understood that for particular encoding standards, encoding of certain frames beyond an acquisition sequence may be restricted. For instance, in H.264, 5 reference frames are compared by the encoder to select reference data. Then, under the H.264 standard, if a refresh sequence is accomplished in fewer than 5 frames, the next subsequent frames will be restricted from referring to frames preceding the first acquisition frame 501. For example, if the refresh is completed in 3 acquisition frames 501, 502, and 503, the frames preceding acquisition frame 501 can be excluded from consideration as reference data for the three frames following the acquisition frames 501, 502, and 503.

It should be noted that in the above example, the first, second, and third refresh portions 511, 512, and 513 meet the minimum area requirement for anchor frames (P-frames or I-frames). In some examples, there may be other type of frames in between these anchor frames such as B-frames. Scene changes can occur during the refreshing period and the scene change frames may be encoded as I-frames. To improve encoding efficiency, all scene change frames except the last frame may be exempted from having a refresh portion.

The granularity of the refresh portions can be larger than single pixels. In some examples, choosing the granularity to the minimal encoding unit is accurate enough because most popular video standards employ block-based motion estimation and transforms. Running the algorithm at block level in stead of pixel level significantly reduces computation load at minimum performance penalty. The block size in AVC is 4×4, which is a natural choice if we implement the progressive refreshing algorithm in AVC.

Figure 7:
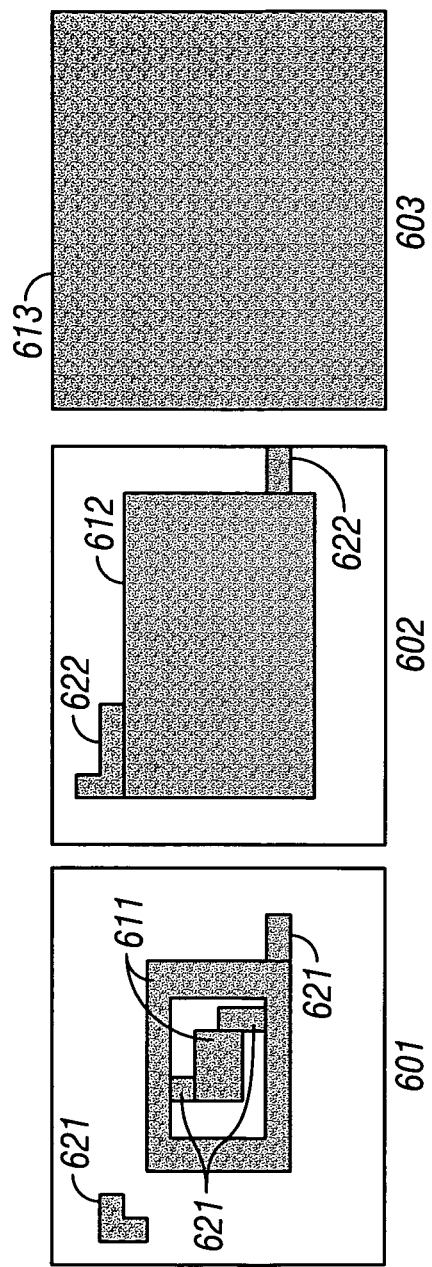
FIG. 7 depicts a frame sequence where a frame of multimedia data is dynamically refreshed.

FIG. 7 depicts a frame sequence where a completely refreshed viewable frame is progressively generated, for example, by acquisition sequence component 125 of FIG. 1, or module for selecting 225 of FIG. 2. In this example, the acquisition sequence comprises three acquisition frames 601-603. Acquisition frame 601 comprises a refresh portion 611, which is restricted to being refreshed, which may be accomplished by intra-coding. The portion of acquisition frame 601 not included in refresh portion 611 is unrestricted, and therefore may be encoded by either intra-coding or inter-coding, and may be either refreshed or not refreshed. For example, refresh portion 621 is not included in refresh portion 611, but is nonetheless intra-coded, and therefore, is refreshed. After encoding acquisition frame 601, a record is kept of the refreshed portions of acquisition frame 601.

Similarly, acquisition frame 602 comprises a refresh portion 612, which covers and extends beyond a co-located area of the refresh portion 611. Refresh portion 612 may be encoded by either intra-coding or inter-coding, and is restricted to being refreshed. Refresh portion 622 is dynamically selected according to a rate distortion (R-D) algorithm which determines a preferred encoding method (e.g. intra-coding) with an optimization function relating available data bandwidth and data quality. Accordingly, refresh portion 612 may be encoded by either intra-coding or inter-coding based on reference data of another refresh portion, such as refresh portion 611. In this aspect, the R-D algorithm can be modified so as to only consider data of acquisition frames of the refresh sequence as potential reference data, and to therefore exclude frames of data previous to the refresh sequence. After encoding acquisition frame 602, a record may be kept of the refreshed portions of acquisition frame 602.

Acquisition frame 603 comprises a refresh portion 613, which covers and extends beyond a co-located area of the refresh portion 612. As shown in FIG. 7, refresh portion 613 substantially completely covers acquisition frame 603. Refresh portion 613 may be encoded by either intra-coding or inter-coding, and is restricted to being refreshed. Therefore, if refresh portion 613 is inter-coded, the algorithm optionally uses a refreshed portion of a prior acquisition frame, such as refresh portion 611 or refresh portion 612, as a reference for the inter-coding.

In this example, the refresh sequence comprises three frames. The determination of how many acquisition frames are in the refresh sequence may be made based on the number of frames the R-D algorithm looks back to for reference data. In some implementations, acquisition sequence component 125 of FIG. 1 or module for selecting 225 of FIG. 2 can include more or fewer frames in the refresh sequence. For example, a refresh sequence may comprise one or more additional acquisition frames between the second and third acquisition frames. The additional acquisition frames would each comprise first and second refresh portions, where the first refresh portion is co-located with at least part of the refreshed portion of a previous acquisition frame, and the second refresh portion is dynamically selected based, for example, on the R-D mode decision algorithm. Each of the first and second refresh portions could be refreshed by intra-coding. Alternatively, each of the first and second refresh portions could be refreshed by inter-coding based on reference data of a refreshed portion of a previous acquisition frame. However, so as to ensure refreshing of the first and second refresh portions, portions of previous frames outside of the refreshed portions of those frames can be excluded from being used as reference data for the first and second refresh portions of a current acquisition frame. For example, portions of acquisition frame 602 outside of refresh portions 612 and 622 may be excluded from being used as reference data for a fourth acquisition frame (not shown) between acquisition frames 602 and 603.

As described above, the frames preceding acquisition frame 601 can be excluded from consideration as reference data for frames following the acquisition frames 601, 602, and 603. Such exclusion may be advantageous where an encoding standard would otherwise include the frames for consideration.

In some implementations, the various refresh and non-refresh portions of each of the acquisition frames are determined through a single pass of the source multimedia data. In other implementations two or more passes are performed, where information gained in a previous pass is used to modify the decisions of the current pass. For example, in a previous pass, a portion of a second frame may be determined to be a refresh portion. However, analysis of the refresh sequence may reveal that the portion of the second frame is never used as reference data in subsequent frames. As such, the cost of the computational load of refreshing the portion may be avoided, by not refreshing the portion. Other advantages and efficiencies may be achieved through multiple passes of multimedia data analysis.

The above discussion applies to anchor frames, which can be used as sources of reference data for other frames. B frames, or Bi-directional frames, which cannot be used as sources of reference data, may occur between anchor frames. B frames may be predicted from previous frames and from subsequent frames. In order to decrease the refresh completion time, if a B frame occurs near the first acquisition frame which is completely refreshed, it may be advantageous to restrict the R-D algorithm to encode the B frame only based on refreshed data of either previous or subsequent anchor frames.

Figure 8:
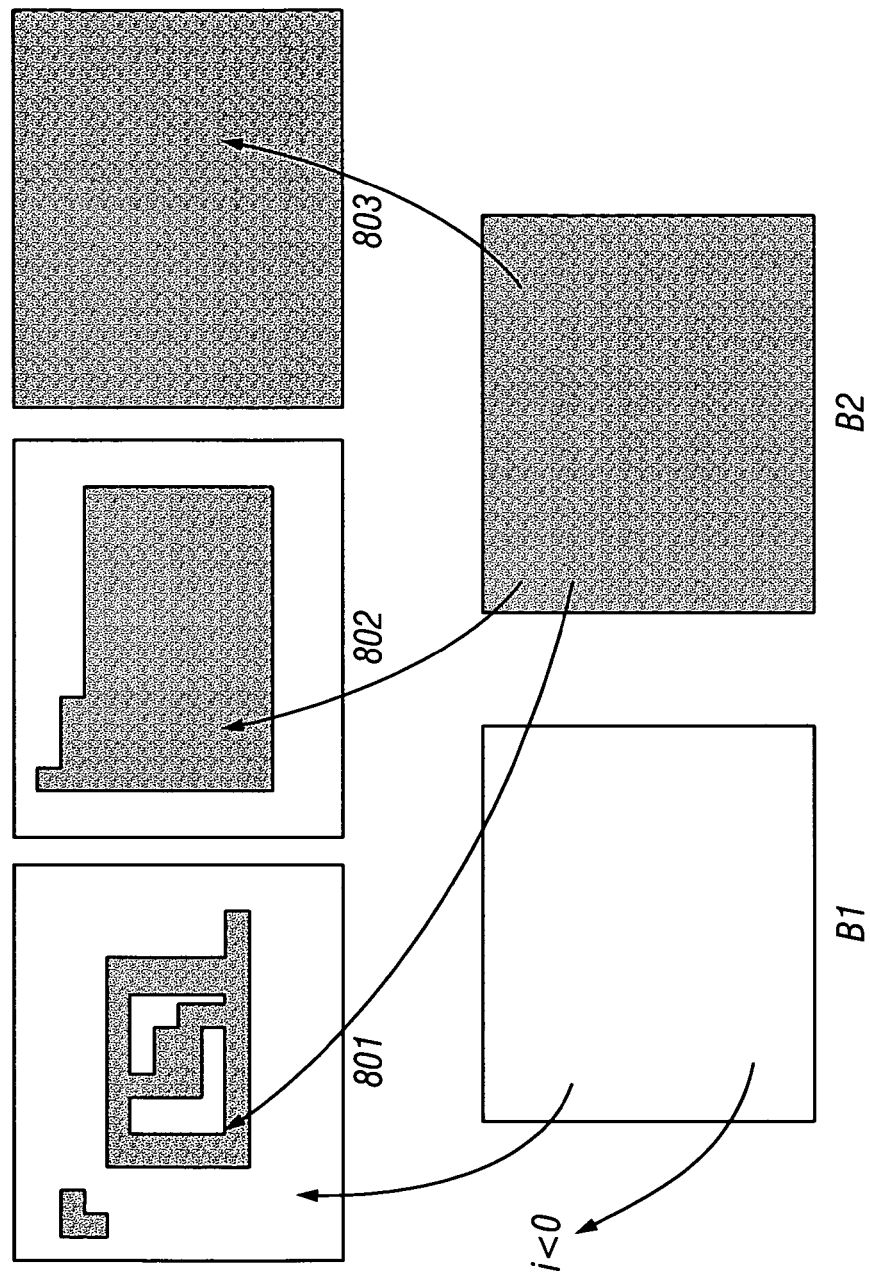
FIG. 8 depicts a frame sequence having B frames where a frame of multimedia data is refreshed.

For example, FIG. 8 shows a refresh sequence with three acquisition frames 801, 802, and 803, which are anchor frames. The refresh sequence also has two B frames B1 and B2. The first B frame B1 occurs between anchor frames 801 and 802. Because there is a subsequent anchor frame which is not completely refreshed (anchor frame 802), whether or not B frame B1 is refreshed does not affect the completion time of the refresh. Therefore, no restriction of the R-D algorithm may be needed. The second B frame B2, however, lies immediately before a fully refreshed anchor frame 803. Therefore, to achieve shorter refresh time, the R-D algorithm is set to ensure that B frame B2 is encoded with reference only to refreshed data from subsequent or from previous frames.

In general, any B frame that lies between the first anchor frame of the refresh sequence and the last non-completely refreshed anchor frame of the sequence may be encoded using reference data of any other anchor frame. However, to minimize refresh time, any B frame that lies between the last anchor frame not completely refreshed and prior to a first completely refreshed frame may be completely refreshed by encoding with reference only to refreshed portions of one or more previous anchor frames and/or to subsequent refreshed anchor frames.

The above refresh time improving restriction applies to both full-pixel and sub-pixel motion estimation. In AVC, motion vectors are allowed to have half-pixel or quarter-pixel values. These sub-pixel values are interpolated from neighboring full pixels. One interpolation filter proposed by AVC is (1, −5, 20, 20, −5, 1), whose length is longer than two. Therefore, to ensure that no unrefreshed data affect a pixel being refreshed, all of the six contributing reference pixels should be refreshed. In some implementations, however, ensuring that the pixels of the two dominant taps are refreshed is enough, and the visual artifacts are negligible due to the small contribution of other taps, despite the pixels of the non-dominant taps being unrefreshed.

In some implementations, portions of anchor frames can be encoded in the SKIP mode. In SKIP mode, reference frames and MVs are not explicitly encoded, but are rather derived from context. Similarly, portions of B frames can be encoded in the DIRECT mode (either spatial or temporal). The reference frames and Mvs of DIRECT-encoded B portions are also derived from context. In such implementations, the encoder can ensure that the SKIP-coded and the DIRECT-coded portions are encoded with reference to refreshed portions, if appropriate.

Figure 9:
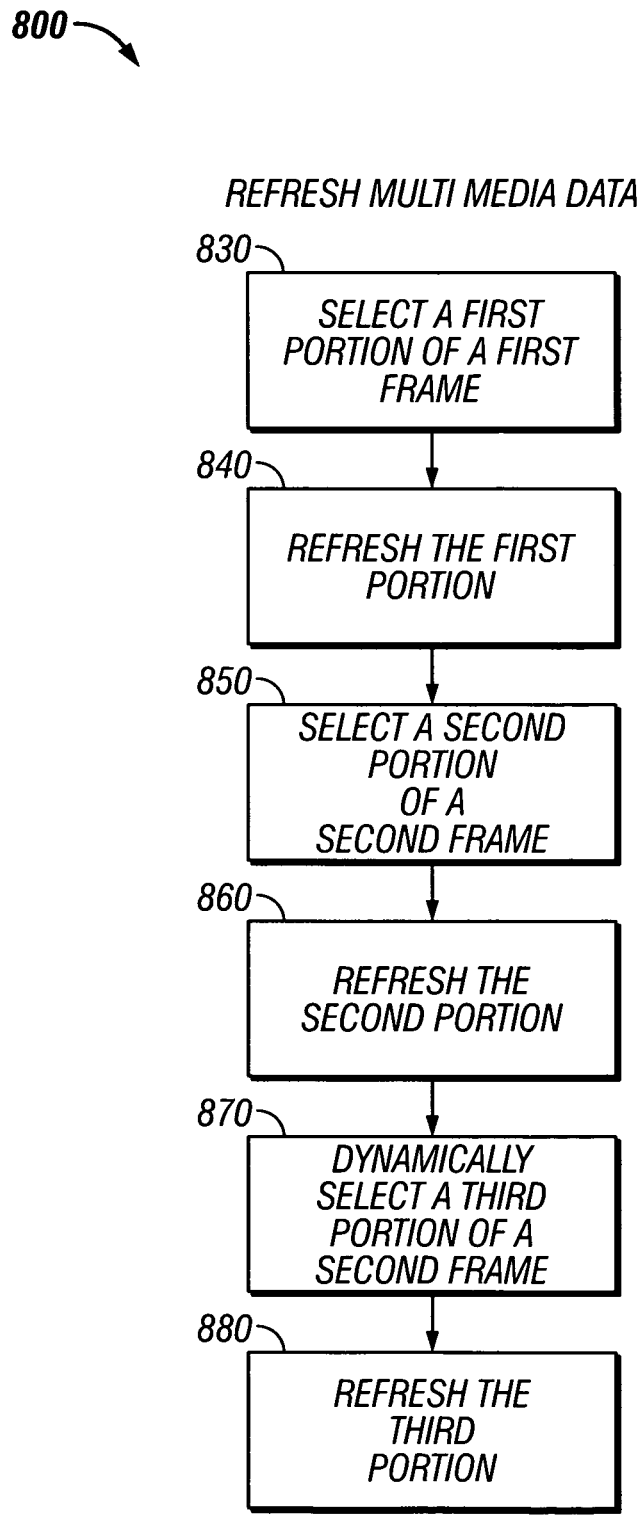
FIG. 9 is a flowchart illustrating an example of an refreshing a frame of multimedia data over a sequence of frames.

FIG. 9 is a flowchart of a method of certain implementations. FIG. 9 shows method 800 used to process a sequence of frames of multimedia data which can, for example, be implemented with acquisition sequence component 125 of FIG. 1 or module for selecting 225 of FIG. 2.

In step 830 a first portion of a first frame is selected. The selection may be made based on predetermined factors, such as size, shape, and location. In some implementations, the selection is performed dynamically, and may be based on substantially real time information such as the data and/or other operational conditions or settings.

In step 840 the first portion is refreshed. This may be done, for example, by intra-coding the first portion. The results of this operation include that the first portion of the first frame is refreshed, as it is encoded based on source multimedia data of the first frame or of subsequent frames. Portions of the first frame not included in the first portion may not be refreshed.

In step 850 a second portion of a second frame is selected. The selection may be made based on predetermined factors, such as size, shape, and location. In some implementations, the selection is performed dynamically, and may be based on substantially real time information such as the data and/or other operational conditions or settings.

In step 860 the second portion is refreshed. This may be done, for example, by intra-coding some or all of the second portion or by inter-coding some or all of the second portion based on the refreshed first portion. The results of this operation include that the second portion of the second frame is refreshed, as it is encoded based on source multimedia data of the first frame or of subsequent frames. Portions of the second frame not included in the second portion may not be refreshed.

In step 870 a third portion of a second frame is selected. The selection may be performed dynamically, and may be based on substantially real time information such as the data and/or other operational conditions or settings. For example, an R-D decision algorithm can be used to select the third portion.

In step 880 the third portion is refreshed. This may be done, for example, by intra-coding some or all of the third portion or by inter-coding some or all of the third portion based on the refreshed first portion. The results of this operation include that the third portion of the second frame is refreshed by being encoded based on source multimedia data of the first frame or of subsequent frames. Portions of the third frame not included in the second and third portions may or may not be refreshed. Portions of frames subsequent to the second frame may be refreshed by encoding them using the first, second and third portions as reference data.

The methods described can be used for any network, wired or wireless. Networks where data error rates can be fairly high, such as, for example, wireless LAN's (local area networks), wireless WAN's (wide area networks) or cellular networks, can benefit from the use of acquisition sequences. Acquisition sequences offer a low bit rate alternative to I Frames for providing random access points that are useful for channel switching in a multi-channel video delivery system. Acquisition sequences can tend to prevent error propagation and drift error since the introduction of the intra-coded portions will form a new starting point for decoding since no inter-coded portion, positioned in the same position as one of the intra-coded portions contained in one of the encoded acquisition frames, should reference a frame occurring prior to the encoded acquisition frame within which the portion was intra-coded.

Aspects of the methods, apparatus and system described include, but are not limited to, the descriptions below.

A method of processing a sequence of frames of multimedia data, the method including selecting a first portion of a first frame of the sequence, refreshing the first portion by intra-coding the first portion, selecting at least one second portion of a second frame of the sequence, where the at least one second portion covers an area of the second frame that is co-located with the first portion, refreshing the at least one second portion by coding the at least one second portion, dynamically selecting at least one third portion of the second frame, refreshing the at least one third portion by coding the at least one third portion, where the at least one second portion and the at least one third portion are optionally used as reference data for subsequent frames.

An apparatus configured to process a sequence of frames of multimedia data, the apparatus including means for selecting a first portion of a first frame of the sequence, means for refreshing the first portion by intra-coding the first portion, means for selecting at least one second portion of a second frame of the sequence, where the at least one second portion covers an area of the second frame that is co-located with the first portion, means for refreshing the at least one second portion by coding the at least one second portion, means for dynamically selecting at least one third portion of the second frame, means for refreshing the at least one third portion by coding the at least one third portion, where the at least one second portion and the at least one third portion are optionally used as reference data for subsequent frames.

An electronic device configured to process a sequence of frames of multimedia data, the device including a first selection module, configured to select a first portion of a first frame of the sequence, a first encoding module, configured to refresh the first portion by intra-coding the first portion, a second selection module, configured to select at least one second portion of a second frame of the sequence, where the at least one second portion covers an area of the second frame that is co-located with the first portion, a second encoding module, configured to refresh the at least one second portion by coding the at least one second portion, a third selection module, configured to dynamically select at least one third portion of the second frame, a third encoding module, configured to refresh the at least one third portion by coding the at least one third portion, where the at least one second portion and the at least one third portion are optionally used as reference data for subsequent frames.

A machine readable medium having instructions for causing a machine to execute a method of processing a sequence of frames of multimedia data, the method including selecting a first portion of a first frame of the sequence, refreshing the first portion by intra-coding the first portion, selecting at least one second portion of a second frame of the sequence, where the at least one second portion covers an area of the second frame that is co-located with the first portion, refreshing the at least one second portion by coding the at least one second portion, dynamically selecting at least one third portion of the second frame, refreshing the at least one third portion by coding the at least one third portion, where the at least one second portion and the at least one third portion are optionally used as reference data for subsequent frames.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the examples.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person skilled in the art to make or use the disclosed examples. Various modifications to these examples will be readily apparent to those skilled in the art, and the principles defined herein may be applied to other examples without departing from the spirit or scope of the invention.

Thus, a method and system for enabling random access of a video stream from non-Intra-coded frames through use of intra-coded portions within otherwise temporally predicted frames, have been described.

What is claimed is:

1. A method of processing a sequence of frames of multimedia data, the method comprising:
   selecting a first portion of a first frame of the sequence;
   refreshing the first portion by intra-coding the first portion;
   selecting at least one second portion of a second frame of the sequence, wherein the at least one second portion entirely covers and extends beyond an area of the second frame that is co-located with the first portion;
   refreshing the at least one second portion by coding the at least one second portion based on data associated with the refreshed first portion;
   dynamically selecting at least one third portion of a third frame; and
   refreshing the at least one third portion by coding the at least one third portion based on data associated with the refreshed first portion or the refreshed second portion, wherein the at least one second portion and the at least one third portion are optionally used as reference data for subsequent frames.

2. The method of claim 1, wherein coding of the second or third portion comprises inter-coding the second or third portion.

3. The method of claim 1, wherein coding of the second or third portion comprises intra-coding the second or third portion.

4. The method of claim 1, wherein the multimedia data is processed in a single pass.

5. The method of claim 1, wherein the multimedia data is processed in more than one pass.

6. The method of claim 1, further comprising encoding at least one of the first, second and third portions based at least in part on the selecting of at least one of the first, second, and third portions.

7. The method of claim 1, wherein the at least one second portion comprises a plurality of second portions, and further wherein one of the second portions is selected as reference data to refresh at least one portion of another frame in the sequence.

8. The method of claim 7, further comprising reducing the area of the second portion, wherein the reduction is based on which of the second portions have been selected as reference data to refresh at least one portion of another frame in the sequence.

9. The method of claim 1, wherein the first refresh frame is the first frame in a superframe.

10. The method of claim 1, wherein the third portion covers substantially all of the third frame.

11. The method of claim 1, further comprising selectively determining a total number of frames in the sequence for refreshing substantially an entire frame.

12. The method of claim 1, wherein the first refresh portion comprises a substantially central portion of the first refresh frame.

13. The method of claim 1, wherein the first refresh portion comprises at least a predetermined substantially rectangular area.

14. The method of claim 1, wherein portions of the at least one second frame outside the second portion is excluded from being used as reference data for subsequent frames.

15. The method of claim 10, further comprising refreshing a bi-directional frame, the bi-directional frame occurring after a last anchor frame not completely refreshed and prior to a first completely refreshed frame.

16. The method of claim 1, further comprising refreshing at least one portion of a frame in reference to a plurality of weighted portions of previous frames, wherein one or more of the weighted portions having non-dominant weights are unrefreshed.

17. An apparatus configured to process a sequence of frames of multimedia data, the apparatus comprising:
   means for selecting a first portion of a first frame of the sequence;
   means for refreshing the first portion by intra-coding the first portion;
   means for selecting at least one second portion of a second frame of the sequence, wherein the at least one second portion entirely covers and extends beyond an area of the second frame that is co-located with the first portion;
   means for refreshing the at least one second portion by coding the at least one second portion based on data associated with the refreshed first portion;
   means for dynamically selecting at least one third portion of a third frame; and means for refreshing the at least one third portion by coding the at least one third portion based on data associated with the refreshed first portion or the refreshed second portion, wherein the at least one second portion and the at least one third portion are optionally used as reference data for subsequent frames.

18. The apparatus of claim 17, wherein the means for refreshing the second or third portion comprises means for inter-coding the second or third portion.

19. The apparatus of claim 17, wherein the means for refreshing the second or third portion comprises means for intra-coding the second or third portion.

20. The apparatus of claim 17, wherein the apparatus is configured to process the multimedia data in a single pass.

21. The apparatus of claim 17, wherein the apparatus is configured to process the multimedia data in more than one pass.

22. The apparatus of claim 17, further comprising means for encoding at least one of the first, second and third portions based at least in part on the selecting of at least one of the first, second, and third portions.

23. The apparatus of claim 17, further comprising means for selecting portions of the second portion as reference data to refresh at least one portion of another frame in the sequence.

24. The apparatus of claim 23, further comprising means for reducing the area of the second portion, wherein the reduction is based on which of the second portions have been selected as reference data to refresh at least one portion of another frame in the sequence.

25. The apparatus of claim 17, wherein the third portion covers substantially all of the third frame.

26. The apparatus of claim 17, wherein portions of the at least one second frame outside the second portion is excluded from being used as reference data for subsequent frames.

27. The apparatus of claim 17, further comprising means for selectively determining a total number of frames in the sequence for refreshing substantially an entire frame.

28. The apparatus of claim 17, wherein the first refresh portion comprises a substantially central portion of the first refresh frame.

29. The apparatus of claim 17, wherein the first refresh portion comprises at least a predetermined substantially rectangular area.

30. The apparatus of claim 26, further comprising means for refreshing a bidirectional frame, the bi-directional frame occurring after a last anchor frame not completely refreshed and prior to a first completely refreshed frame.

31. The apparatus of claim 17, further comprising means for refreshing at least one portion of a frame in reference to a plurality of weighted portions of previous frames, wherein one or more of the weighted portions having non-dominant weights are unrefreshed.

32. An apparatus configured to process a sequence of frames of multimedia data, comprising:
 a first selection module, configured to select a first portion of a first frame of the sequence;
 a first encoding module, configured to refresh the first portion by intra-coding the first portion;
 a second selection module, configured to select at least one second portion of a second frame of the sequence, wherein the at least one second portion entirely covers and extends beyond an area of the second frame that is co-located with the first portion;
 a second encoding module, configured to refresh the at least one second portion by coding the at least one second portion based on data associated with the refreshed first portion;
 a third selection module, configured to dynamically select at least one third portion of a third frame;
 a third encoding module, configured to refresh the at least one third portion by coding the at least one third portion based on data associated with the refreshed first portion or the refreshed second portion, wherein the at least one second portion and the at least one third portion are optionally used as reference data for subsequent frames.

33. The apparatus of claim 32, wherein the second and third encoding modules are configured to inter-code the second and third portions.

34. The apparatus of claim 32, wherein the device is configured to process the multimedia data in more than one pass.

35. The apparatus of claim 32, further configured to reduce the area of the second portion, wherein the reduction is based on which of the second portions have been selected as reference data to refresh at least one portion of another frame in the sequence.

36. The apparatus of claim 32, further comprising one or more additional encoding modules, configured to encode the subsequent frames and to exclude portions of the at least one second frame outside the second portion from being used as reference data for encoding the subsequent frames.

37. A non-transitory machine readable medium comprising instructions for processing a sequence of frames of multimedia data, wherein the instructions upon execution cause a machine to:
 select a first portion of a first frame of the sequence;
 refresh the first portion by intra-coding the first portion;
 select at least one second portion of a second frame of the sequence, wherein the at least one second portion entirely covers and extends beyond an area of the second frame that is collocated with the first portion;
 refresh the at least one second portion by coding the at least one second portion based on data associated with the refreshed first portion;
 dynamically select at least one third portion of a third frame;
 refresh the at least one third portion by coding the at least one third portion based on data associated with the refreshed first portion or the refreshed second portion, wherein the at least one second portion and the at least one third portion are optionally used as reference data for subsequent frames.

38. The non-transitory machine readable medium of claim 37, wherein coding of the second or third portion comprises intra-coding the second or third portion.

39. The non-transitory machine readable medium of claim 37, wherein the instructions when executed further cause the machine to reduce the area of the second portion, wherein the reduction is based on which of the second portions have been selected as reference data to refresh at least one portion of another frame in the sequence.

40. The non-transitory machine readable medium of claim 37, wherein the instructions when executed further cause the machine to exclude portions of the at least one second frame outside the second portion from being used as reference data for subsequent frames.

41. A processor for processing a sequence of frames of multimedia data, said processor being configured to:
 select a first portion of a first frame of the sequence;
 refresh the first portion by intra-coding the first portion;
 select at least one second portion of a second frame of the sequence, wherein the at least one second portion entirely covers and extends beyond an area of the second frame that is collocated with the first portion;
 refresh the at least one second portion by coding the at least one second portion based on data associated with the refreshed first portion;

dynamically select at least one third portion of a third frame; and refresh the at least one third portion by coding the at least one third portion based on data associated with the refreshed first portion or the refreshed second portion, wherein the at least one second portion and the at least one third portion are optionally used as reference data for subsequent frames.

42. The processor of claim 41, wherein the area of the second portion is reduced based on which of the second portions have been selected as reference data to refresh at least one portion of another frame in the sequence.

43. The processor of claim 41, wherein portions of the at least one second frame outside the second portion is excluded from being used as reference data for subsequent frames.

* * * * *